(12) United States Patent
Choi et al.

(10) Patent No.: US 12,113,718 B2
(45) Date of Patent: Oct. 8, 2024

(54) APPARATUS AND METHOD FOR RESOURCE ALLOCATION IN EDGE COMPUTING ENVIRONMENT

(71) Applicant: ELECTRONICS AND TELECOMMUNICATIONS RESEARCH INSTITUTE, Daejeon (KR)

(72) Inventors: Hyun-Hwa Choi, Daejeon (KR);
Dae-Won Kim, Daejeon (KR);
Sun-Wook Kim, Hwaseong-si (KR);
Su-Min Jang, Sejong-si (KR);
Jae-Geun Cha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/983,577

(22) Filed: Nov. 9, 2022

(65) Prior Publication Data
US 2023/0155959 A1  May 18, 2023

(30) Foreign Application Priority Data

Nov. 12, 2021  (KR) .................. 10-2021-0155997
Oct. 14, 2022  (KR) .................. 10-2022-0132462

(51) Int. Cl.
*H04L 47/80* (2022.01)
*H04L 47/70* (2022.01)
*H04L 47/78* (2022.01)

(52) U.S. Cl.
CPC .......... *H04L 47/801* (2013.01); *H04L 47/781* (2013.01); *H04L 47/822* (2013.01)

(58) Field of Classification Search
CPC .... H04L 47/801; H04L 47/781; H04L 47/822
USPC ........................................................ 709/226
See application file for complete search history.

(56) References Cited

U.S. PATENT DOCUMENTS

| 9,154,589 | B1 * | 10/2015 | Klein ................ H04L 41/083 |
| 11,321,132 | B2 | 5/2022 | Choi et al. |
| 2009/0296582 | A1 * | 12/2009 | Shi ........................ H04L 47/39 370/236 |
| 2011/0153812 | A1 | 6/2011 | Yoon et al. |
| 2012/0155255 | A1 * | 6/2012 | Gerber ................. H04W 24/08 370/230 |
| 2013/0042119 | A1 * | 2/2013 | Bennett .................. H04L 49/40 713/300 |
| 2019/0044946 | A1 | 2/2019 | Hwang et al. |

(Continued)

FOREIGN PATENT DOCUMENTS

| KR | 10-2018-0047070 A | 5/2018 |
| KR | 10-2020-0013129 A | 2/2020 |

(Continued)

*Primary Examiner* — Wing F Chan
*Assistant Examiner* — Leon Y Tseng
(74) *Attorney, Agent, or Firm* — LRK PATENT LAW FIRM (57) ABSTRACT

Disclosed herein is a method for resource allocation in an edge-computing environment. The method includes receiving a request for an intelligent edge service, selecting the worker server to execute the service based on an input/output congestion level, allocating resources based on topology information of the worker server, and configuring a virtual environment based on the allocated resources.

14 Claims, 10 Drawing Sheets

(56) References Cited

U.S. PATENT DOCUMENTS

| | | | |
|---|---|---|---|
| 2021/0124617 A1* | 4/2021 | Choi | G06F 9/5072 |
| 2021/0144517 A1* | 5/2021 | Guim Bernat | H04L 41/0869 |
| 2022/0182291 A1 | 6/2022 | Doshi et al. | |

FOREIGN PATENT DOCUMENTS

| KR | 10-2021-0049551 A | 5/2021 |
|---|---|---|
| KR | 10-2021-0056655 A | 5/2021 |
| KR | 10-2021-0081227 A | 7/2021 |

\* cited by examiner

APPARATUS AND METHOD FOR RESOURCE ALLOCATION IN EDGE COMPUTING ENVIRONMENT

CROSS REFERENCE TO RELATED APPLICATIONS

This application claims the benefit of Korean Patent Application No. 10-2021-0155997, filed Nov. 12, 2021, and No. 10-2022-0132462, filed Oct. 14, 2022, which are hereby incorporated by reference in their entireties into this application.

BACKGROUND OF THE INVENTION

1. Technical Field

The present disclosure relates to technology for providing fast execution of an intelligent edge service in an edge-computing environment.

More particularly, the present disclosure relates to technology for improving service execution performance by allocating resources for an intelligent edge service.

2. Description of Related Art

Recently, the number of Internet-of-Things (IoT) devices has been exponentially increased with the advent of the Fourth Industrial Revolution, and 41 billion or more IoT devices are expected to be connected to the Internet by 2025. Also, the total amount of global data is predicted to reach 174 ZB by 2025, which is five times more than now.

Currently, existing centralized cloud computing has problems, such as high end-to-end latency resulting from a long distance between a device and a computing server, a network bandwidth limitation caused by the rapidly increasing amount of data, the exposure of personal information, and the like. In order to solve these problems, edge computing is introduced. Edge computing is a new computing paradigm for storing and processing data in the internet edge that is closest to mobile devices or sensors.

In connection with edge computing, a lot of research and effort are being put into providing an intelligent service having an Artificial Intelligence (AI) module, including a Deep Neural Network (DNN). Voice, face, motion, and context recognition based on AI modules has advantages in that it may improve user's immersion to an intelligent edge service, such as virtual reality or augmented reality, and in that it may provide a user-customized service.

The intelligent edge service is provided based on virtualization technology, such as virtual machines or containers, in order to flexibly respond to the rapid increase in the amount of data and service update. Meanwhile, in order to provide a fast intelligent edge service, resources are allocated in consideration of the fact that most computing servers have a Non-Uniform Memory Access (NUMA) architecture.

Also, as technology for supporting high bandwidth, such as NVLink, has been recently introduced to GPUs, a specialized resource allocation method for guaranteeing the processing performance of an intelligent edge service is urgently required.

DOCUMENTS OF RELATED ART (Patent Document 1) Korean Patent Application Publication No. 10-2021-0056655, titled "Method for selecting migration candidate and target based on prediction in cloud-edge environment".

SUMMARY OF THE INVENTION

An object of the present disclosure is to improve service execution performance by optimally allocating resources for an intelligent edge service, which has computing-intensive and input/output (I/O)—intensive characteristics, in a virtual environment.

Another object of the present disclosure is to allocate an input resource based on a data congestion level, thereby guaranteeing the performance of a service that uses input data requiring high bandwidth.

A further object of the present disclosure is to guarantee high bandwidth by allocating resources based on resource topology information.

In order to accomplish the above objects, a method for resource allocation in an edge-computing environment according to an embodiment of the present disclosure includes receiving a request for an intelligent edge service, selecting a worker server to execute the service based on an input/output (I/O) congestion level, allocating resources based on topology information of the worker server, and configuring a virtual environment based on the allocated resources.

Here, the I/O congestion level may correspond to the ratio of average bandwidth usage to the maximum bandwidth of I/O devices in the worker server for a preset time.

Here, selecting the worker server may comprise selecting the worker server to execute the service based on I/O congestion level information, network congestion level information, and storage congestion level information.

Here, selecting the worker server may include receiving a list comprising worker servers satisfying available resources required for execution of the service and a preset congestion level condition and selecting a worker server having an I/O congestion level corresponding to the preset condition from the list.

Here, selecting the worker server having the I/O congestion level corresponding to the preset condition may comprise selecting a worker server of which an input device, corresponding to execution of the service, has the lowest congestion level.

Here, allocating the resources may include selecting an input resource based on resource requirements for the service, selecting a resource to be used based on information about the distance from the selected input resource, and selecting an additional resource to be used based on information about a connection with the previously selected resource.

Here, selecting the additional resource to be used may comprise, when a resource having a preset connection relationship with the previously selected resource is present, selecting the resource having the preset connection relationship as the resource to be used.

Here, selecting the additional resource to be used may comprise, when a resource having a preset connection relationship with the previously selected resource is not present, selecting a resource corresponding to a preset condition, among remaining resources, as the resource to be used.

Here, selecting the additional resource to be used may comprise, when a resource having a preset connection relationship with the previously selected resource is not present, selecting a resource that is most distant from an immediately previously selected resource, among remaining resources, as the resource to be used.

Here, the preset connection relationship may correspond to a second connection relationship that supports higher bandwidth than a first connection relationship.

Also, in order to accomplish the above objects, an apparatus for resource allocation in an edge-computing environment according to an embodiment of the present disclosure includes a global scheduler for receiving a request for an intelligent edge service and selecting a worker server to execute the service based on an input/output (I/O) congestion level and a global resource manager for managing I/O congestion levels and available resource information of worker servers.

Here, the I/O congestion level may correspond to the ratio of average bandwidth usage to the maximum bandwidth of I/O devices in the worker server for a preset time.

Here, the global scheduler may select the worker server to execute the service based on I/O congestion level information, network congestion level information, and storage congestion level information.

Here, the global resource manager may generate a list comprising worker servers satisfying available resources required for execution of the service and a preset congestion level condition, and the global scheduler may select a worker server having an I/O congestion level corresponding to the preset condition from the list.

Here, the global scheduler may select a worker server of which an input device, corresponding to execution of the service, has the lowest congestion level.

Also, in order to accomplish the above objects, an apparatus for resource allocation in an edge-computing environment according to another embodiment of the present disclosure includes a congestion level manager for monitoring the congestion level of an input/output (I/O) device, a local scheduler for receiving a request for an intelligent edge service from a master server and configuring virtual environment configuration information, and a topology manager for allocating resources based on topology information.

Here, the topology manager may select an input resource based on resource requirements for the requested service, select a resource to be used based on information about the distance from the selected input resource, and select an additional resource to be used based on information about a connection with the previously selected resource.

Here, when a resource having a preset connection relationship with the previously selected resource is present, the topology manager may select the resource having the preset connection relationship as the resource to be used.

Here, when a resource having a preset connection relationship with the previously selected resource is not present, the topology manager may select a resource corresponding to a preset condition, among remaining resources, as the resource to be used.

Here, when a resource having a preset connection relationship with the previously selected resource is not present, the topology manager may select a resource that is most distant from an immediately previously selected resource, among remaining resources, as the resource to be used.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

The advantages and features of the present disclosure and methods of achieving the same will be apparent from the exemplary embodiments to be described below in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only, and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

Hereinafter, a resource allocation method according to an embodiment will be described by exemplifying an edge server, but the scope of the present disclosure is not limited thereto, and the method according to an embodiment may be identically applied in various distributed cloud environments.

Also, allocated resources according to an embodiment of the present disclosure include a CPU, a network interface controller (NIC), a Hard Disk Drive (HDD), a Solid-State Drive (SSD), and the like. Also, resources may be a concept including a Graphics Processing Unit (GPU), a Tensor Processing Unit (TPU), a Neural Processing Unit (NPU), and other hardware accelerators, and the scope of the present disclosure is not limited by the types of allocated resources.

Figure 1:
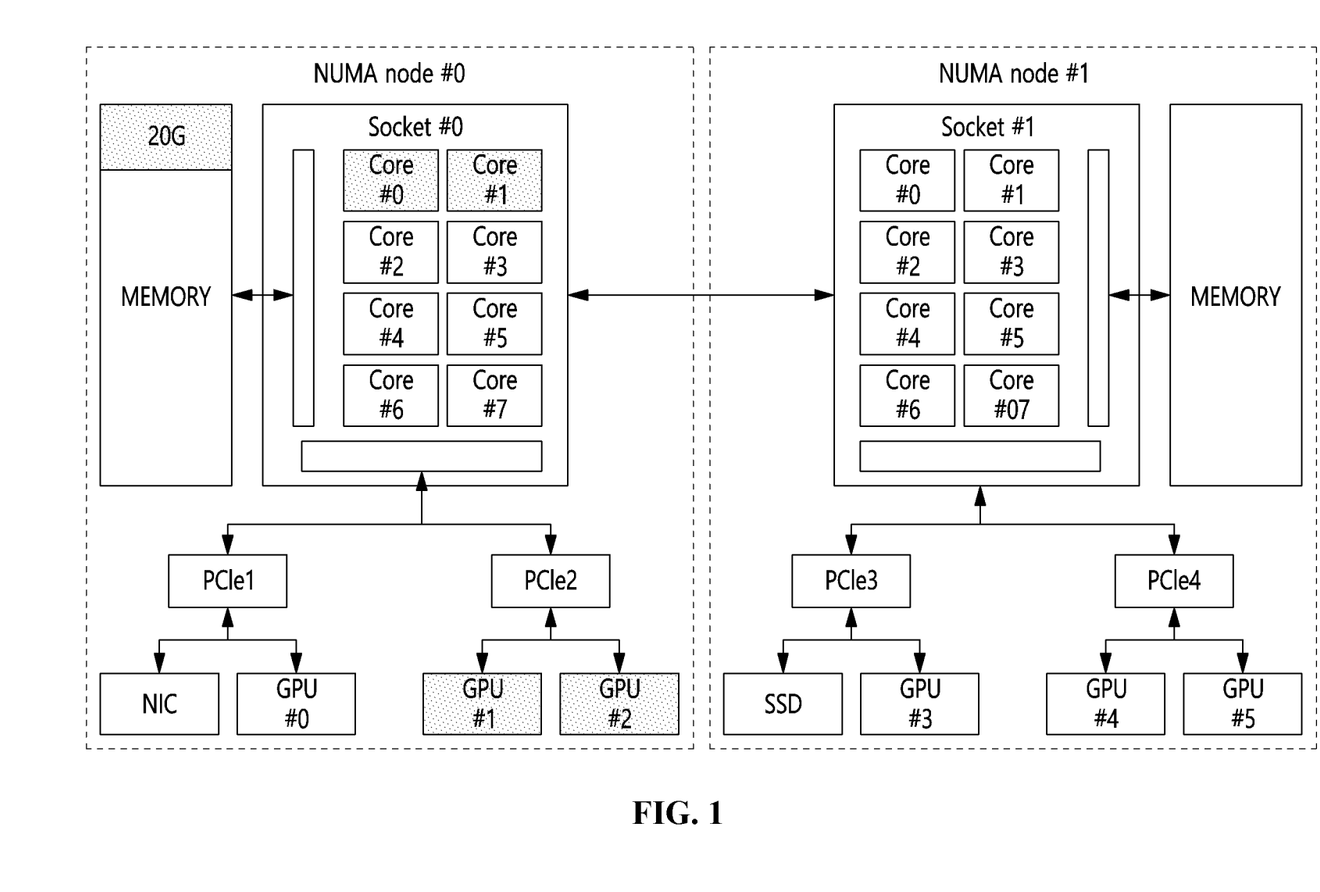
FIG. 1 is an exemplary view illustrating allocation of resources in a single computing server.

FIG. 1 is an exemplary view illustrating allocation of resources in a single computer server.

FIG. 1 shows a resource allocation method in a Non-Uniform Memory Access (NUMA)-architecture-based server for providing fast execution of an intelligent edge service based on resource requirements (two CPUs, 20 GB of memory, and two GPUs).

In FIG. 1, a resource allocation method according to an embodiment is described by illustrating a NUMA-architecture-based server, but the scope of the present disclosure is not limited thereto. The resource allocation method according to an embodiment may be identically applied in resource connection topology in which distance measurement is possible, such as NUMA, CC NUMA, and the like.

As shown in FIG. 1, resources included in the same NUMA node #0 are allocated, whereby a data transfer path and the number of times data is copied are reduced. Accordingly, service performance may be improved.

As a representative example, Kubernetes, which executes services (applications) based on container virtualization technology, allocates resources by selecting one of four policies including 'none', 'best-effort', 'restricted', and 'single-numa-node' when a topology manager is enabled. Particularly, it is recommended to select the 'single-numa-node' policy for fast execution of services.

The 'none' policy, which is a default policy, is the same as the state in which the topology manager is disabled, and resource alignment (arrangement) is not attempted.

In the case of the 'best-effort' policy, the topology manager attempts to allocate as many resources as possible in a NUMA node, but even when it fails to do so, a Pod is executed.

In the case of the 'restricted' policy, when the resources allocated with the 'best-effort' policy are not properly aligned, a Pod fails to be accepted. When resources are not allocated from a single NUMA node, some of the resources may be allocated from multiple NUMA nodes.

In the case of the 'single-numa-node' policy, a Pod is executed only when all CPUs and devices are allocated from exactly one NUMA node.

In the existing resource allocation methods, resources are allocated such that different types of resources based on a NUMA architecture have the shortest distance therebetween, whereby data transfer time is reduced and service execution performance is improved.

However, in the case of PCIe, which is a shared resource for transferring data between networks, storage, and accelerators, a NUMA effect is known to not affect data-processing performance when large-size data is processed based on the transfer between different resources. Meanwhile, as technology for supporting high bandwidth, such as NVLink, is introduced to GPUs, it is necessary to consider connection of different types of data transfer buses between resources in connection with resource allocation.

Particularly, an intelligent edge service transfers large-size video data, such as CCTV data, based on a network and performs inference using various AI modules based on GPUs, and GPUs have different types of connections therebetween. Therefore, a specialized resource allocation method for guaranteeing the processing performance of an intelligent edge service using high bandwidth of a shared resource, such as PCIe, in data processing is required.

The intelligent edge service receives data from mobile devices or various sensors over a network, analyzes the data based on AI modules such as a DNN, and returns an inference result or provides the inference result through applications.

Here, different types of multiple AI modules are executed in a pipeline, and the processes of preprocessing and post-processing data based on a CPU may be required for analysis based on the respective AI modules. Meanwhile, the same AI module is loaded on multiple GPUs, and the AI module may be executed in parallel.

Figure 2:
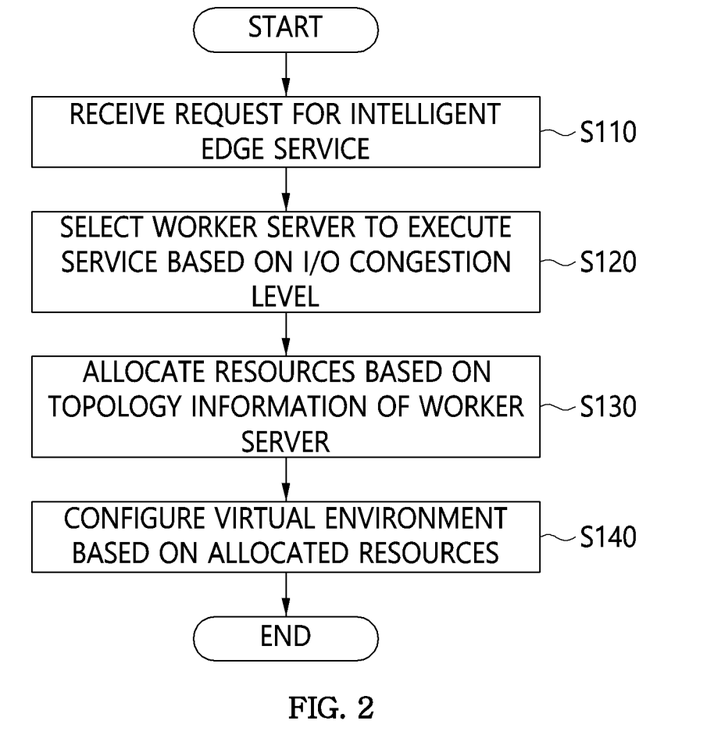
FIG. 2 is a flowchart illustrating a method for resource allocation in an edge-computing environment according to an embodiment of the present disclosure.

FIG. 2 is a flowchart illustrating a method for resource allocation in an edge-computing environment according to an embodiment of the present disclosure.

Referring to FIG. 2, in the method for resource allocation in an edge-computing environment, which is performed by a resource allocation apparatus (a master server and a worker server) in the edge-computing environment, a request for an intelligent edge service is received from a user at step S110.

Subsequently, a worker server to execute the service is selected based on an input/output (I/O) congestion level at step S120.

Here, the I/O congestion level may be the ratio of the average bandwidth usage to the maximum bandwidth of the I/O devices in the worker server for a preset time.

The I/O congestion level $c_x$ of a computing server x may be calculated based on the congestion levels of I/O devices (a network, storage, and the like) installed in the server. For example, the congestion level $c_x$ may be calculated as shown in Equation (1) below:

$$c_x = \frac{1}{n}\sum_{k=1}^{n}\frac{D_{k,a}}{D_{k,m}} \quad (1)$$

Here, $D_{k,m}$ denotes the maximum bandwidth of the I/O device k, and $D_{k,a}$ denotes the average bandwidth usage of the I/O device k for $t_i$. That is, the I/O congestion level $c_x$ of the computing server may be the average of the congestion levels of n I/O devices. The average bandwidth usage $D_{k,a}$ may be calculated as shown in Equation (2) below:

$$D_{k,a} = \frac{1}{t_i} \sum_{i \in S} D_{usage} \text{ for } I/O \text{ Device } k \qquad (2)$$

Here, S is a set of time steps, and one time step $t_i$ is defined as a time period between consecutive time events $T_i$ and $T_{i+1}$.

Here, selecting the worker server at step S120 may comprise selecting the worker server to execute the service based on I/O congestion level information, network congestion level information, and storage congestion level information.

That is, a suitable worker server may be selected using more subdivided congestion levels, such as a network congestion level, a storage congestion level, and the like.

Here, selecting the worker server at step S120 may include receiving a list comprising worker servers satisfying a preset congestion condition and available resources required for execution of the service and selecting the worker server having the I/O congestion level corresponding to the preset condition from the list.

Here, selecting the worker server having the I/O congestion level corresponding to the preset condition may comprise selecting the worker server of which the input device, corresponding to execution of the service, has the lowest congestion level.

Subsequently, resources are allocated based on the topology information of the worker server at step S130.

Here, allocating the resources at step S130 may include selecting an input resource based on the resource requirements for the service, selecting the resource to be used based on information about the distance from the selected input resource, and selecting an additional resource to be used based on information about the connection with the previously selected resource.

Here, selecting the additional resource to be used based on the information about the connection with the previously selected resource may be repeated until the number of selected resources becomes equal to the number of requested resources.

Here, selecting the input resource may comprise, when the number of input resource candidates is less than two, selecting the input resource candidate.

Here, selecting the input resource may comprise, when two or more input resource candidates are present, selecting the input resource candidate having lower bandwidth usage as the input resource.

Here, selecting the additional resource to be used may comprise, when a resource having a preset connection relationship with the previously selected resource is present, selecting the resource having the preset condition relationship as the resource to be used.

Here, selecting the additional resource to be used may comprise, when a resource having a preset connection relationship with the previously selected resource is not present, selecting a resource corresponding to the preset condition, among remaining resources, as the resource to be used.

Here, selecting the additional resource to be used may comprise, when a resource having a preset connection relationship with the previously selected resource is not present, selecting a resource that is most distant from the immediately previously selected resource, among remaining resources, as the resource to be used.

Here, the preset connection relationship may be a second connection relationship that supports higher bandwidth than a first connection relationship.

Here, the first connection relationship may correspond to PCIe and the second connection relationship may correspond to NVLink, but the scope of the present disclosure is not limited thereto, and the connection relationship may be variously configured.

The resource allocation method according to the present disclosure uses distance information based on topology of various devices (storage, a network, and accelerators) installed in a computing server and an I/O congestion level.

Hereinafter, distance information based on topology and an I/O congestion level will be described in detail.

Devices installed in a computing server are usually connected through PCIe, and GPUs may be connected through NVLink as well as PCIe.

The topology of devices in a computing server may include storage such as an HDD, an SSD, and the like, accelerators such as a GPU, and detailed type information of devices required for application of virtualization technology, such as a network card vendor. Information about a connection between devices may be defined as follows:

NV: connection traversing multiple NVLinks
PIX: connection traversing at most a single PCIe bridge
PXB: connection traversing multiple PCIe bridges without traversing a host bridge
PHB: connection traversing a single PCIe host bridge and a PCIe bridge
NODE: connection traversing PCIe as well as interconnect between PCIe host bridges within a single NUMA node
SYS: connection traversing interconnect (QPI, HT) between NUMA nodes (inter-socket)

Based on the information about a connection between corresponding devices, a distance is calculated by taking each of an NVLink, PCIe, a PCIe bridge, a host bridge, and a socket interconnect (QPI or HT) as a hop. For example, the distance information based on the resource topology of the computing server in FIG. 1 may be represented as shown in Table 1 below.

TABLE 1

|  | NIC | GPU0 (Dist) | GPU1 (Dist) | GPU2 (Dist) | SSD (Dist) | GPU3 (Dist) | GPU4 (Dist) | GPU5 (Dist) | CPU Affinity | NUMA Affinity |
|---|---|---|---|---|---|---|---|---|---|---|
| NIC | X | PIX (2) | NODE (4) | NODE (4) | SYS (5) | SYS (5) | SYS (5) | SYS (5) | 0, 2, 4, 6, 8, 10, 12, 14 | 0 |
| GPU0 | PIX (2) | X | PXB (3) | PXB (3) | SYS (5) | SYS (5) | SYS (5) | SYS (5) | 0, 2, 4, 6, 8, 10, 12, 14 | 0 |
| GPU1 | PXB (3) | PXB (3) | X | PIX (2) | SYS (5) | SYS (5) | SYS (5) | SYS (5) | 0, 2, 4, 6, 8, 10, 12, 14 | 0 |

TABLE 1-continued

| | NIC | GPU0 (Dist) | GPU1 (Dist) | GPU2 (Dist) | SSD (Dist) | GPU3 (Dist) | GPU4 (Dist) | GPU5 (Dist) | CPU Affinity | NUMA Affinity |
|---|---|---|---|---|---|---|---|---|---|---|
| GPU2 | PXB (3) | PXB (3) | PIX (2) | X | SYS (5) | SYS (5) | SYS (5) | SYS (5) | 0, 2, 4, 6, 8, 10, 12, 14 | 0 |
| SSD | SYS (5) | SYS (5) | SYS (5) | SYS (5) | X | PIX (2) | PXB (3) | PXB (3) | 1, 3, 5, 7, 9, 11, 13, 15 | 1 |
| GPU3 | SYS (5) | SYS (5) | SYS (5) | SYS (5) | PIX (2) | X | PXB (3) | PXB (3) | 1, 3, 5, 7, 9, 11, 13, 15 | 1 |
| GPU4 | SYS (5) | SYS (5) | SYS (5) | SYS (5) | PXB (3) | PXB (3) | X | PIX (2) | 1, 3, 5, 7, 9, 11, 13, 15 | 1 |
| GPU4 | SYS (5) | SYS (5) | SYS (5) | SYS (5) | PXB (3) | PXB (3) | PIX (2) | X | 1, 3, 5, 7, 9, 11, 13, 15 | 1 |

The I/O congestion level $c_x$ of the computing server x is calculated based on the congestion levels of the I/O devices (a network and storage) installed in the server. When $\forall i,j \in S: i<j, \leftrightarrow T_i<T_j$ is given, S is a set of time steps. A single time step $t_i$ may be defined as a time period between consecutive time events $T_i$ and $T_{i+1}$. That is, $t_i=T_{i+1}-T_i$ is satisfied.

The congestion level of the I/O device k is defined as the ratio of the average bandwidth usage $D_{k,a}$ to the maximum bandwidth $D_{k,m}$ for $T_i$. Accordingly, the I/O congestion level $c_x$ of the computing server may be the average value of the congestion levels of n I/O devices. This may be represented as shown in Equations (1) and (2).

The I/O congestion level of the computing server x may further include more subdivided congestion levels, such as a network congestion level and a storage congestion level. These may be calculated using the same method as the above-described method for calculating the congestion level.

Figure 3:
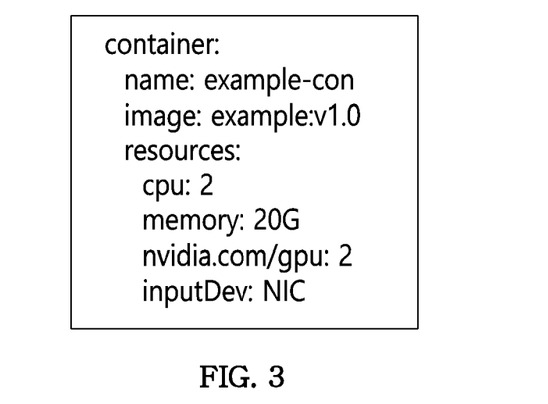
FIG. 3 is an exemplary view illustrating resource requirements for an intelligent edge service in the method according to an embodiment of the present disclosure.

FIG. 3 is an exemplary view illustrating resource requirements for an intelligent edge service in the method according to an embodiment of the present disclosure.

In order to execute a service based on a virtual environment, a lot of pieces of information, such as environment variables, authentication information, and the like, are required, but these are omitted from FIG. 3 in order to focus on a description of the resource allocation method.

In the resource requirements for an intelligent edge service, an input device (inputDev) of inference target data is specified. The input device is specified using the device name used for a virtual environment configuration. Also, assuming that one network card is present even when the resource is not requested, a network is represented as NIC. Meanwhile, when storage is accessed through a network, such as NFS, it is also represented as NIC.

Figure 4:
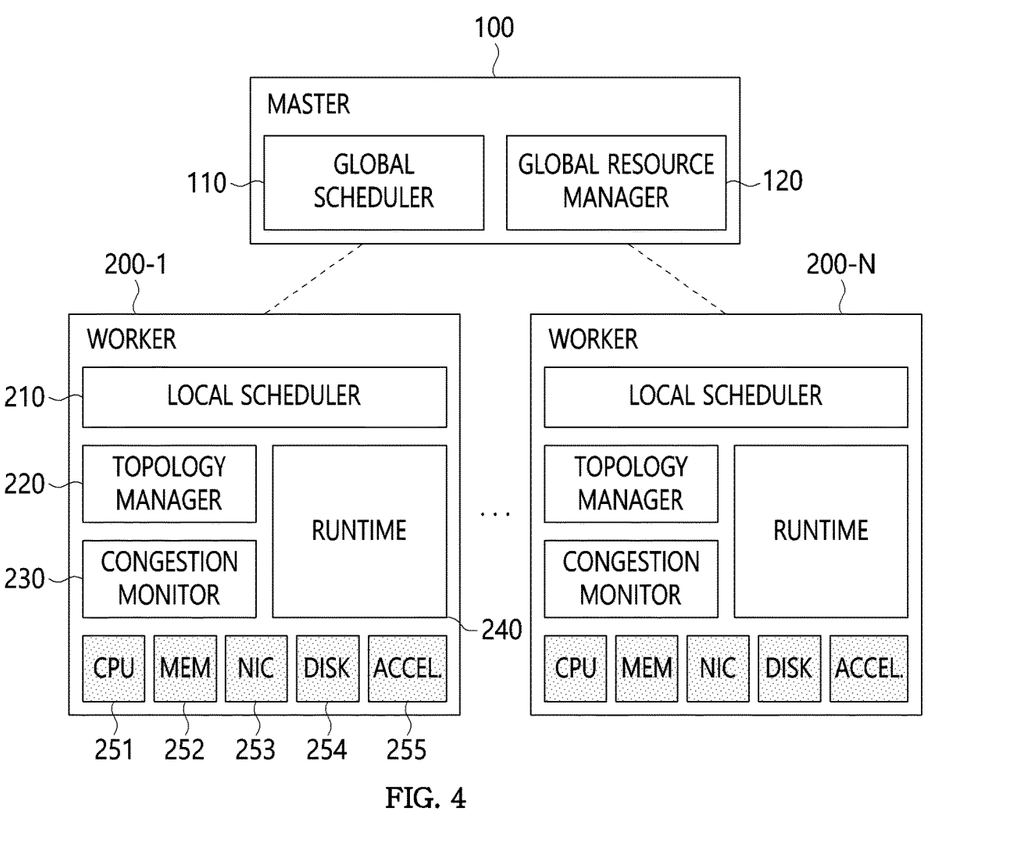
FIG. 4 is a block diagram illustrating a system for resource allocation for an intelligent edge service.

FIG. 4 is a block diagram illustrating a system for resource allocation for an intelligent edge service.

Referring to FIG. 4, a master server 100 includes modules such as a global scheduler 110 and a global resource manager 120.

The global resource manager 120 manages allocated resource information, available resource information, and I/O congestion level information of each worker server.

The global scheduler 110 receives a request to execute an intelligent edge service based on the resource requirements and processes the same.

Here, the global scheduler 110 selects the worker server to execute the service based on the available resource information and I/O congestion level information of each worker server, which are received from the global resource manager 120, and requests the local scheduler 210 of the selected worker server to execute the intelligent edge service. When it is notified of success in execution of the intelligent edge service by the local scheduler 210, the global scheduler 110 changes the available resource information of the worker server through the global resource manager 120.

The congestion monitor 230 of each of the worker servers 200-1, . . . , 200-N monitors the above-described I/O congestion level, a network congestion level, and a storage congestion level and periodically transfers the information to the global resource manager 120.

A topology manager 220 manages allocated resources and available resources based on device topology information of a worker server. The topology manager 220, which receives resource requirements from the local scheduler 210, selects an available resource based on a congestion level, a distance, characteristics of GPU connections, and the like and returns the same.

The local scheduler 210 receives a request to execute an intelligent edge service from the global scheduler 110 and processes the same. First, the local scheduler 210 receives allocable resource candidates from the topology manager 220, configures virtual environment configuration information, and requests a runtime 240 to configure a virtual environment, and transfers the result thereof to the global scheduler 110.

The runtime 240 configures a virtual environment based on the virtual environment information received from the local scheduler 210 and runs the intelligent edge service.

Also, each of the worker servers 200-1, . . . , 200-N may include a CPU 251, memory 252, a network interface controller 253, a disk 254, an accelerator 255, and the like as resources.

Figure 5:
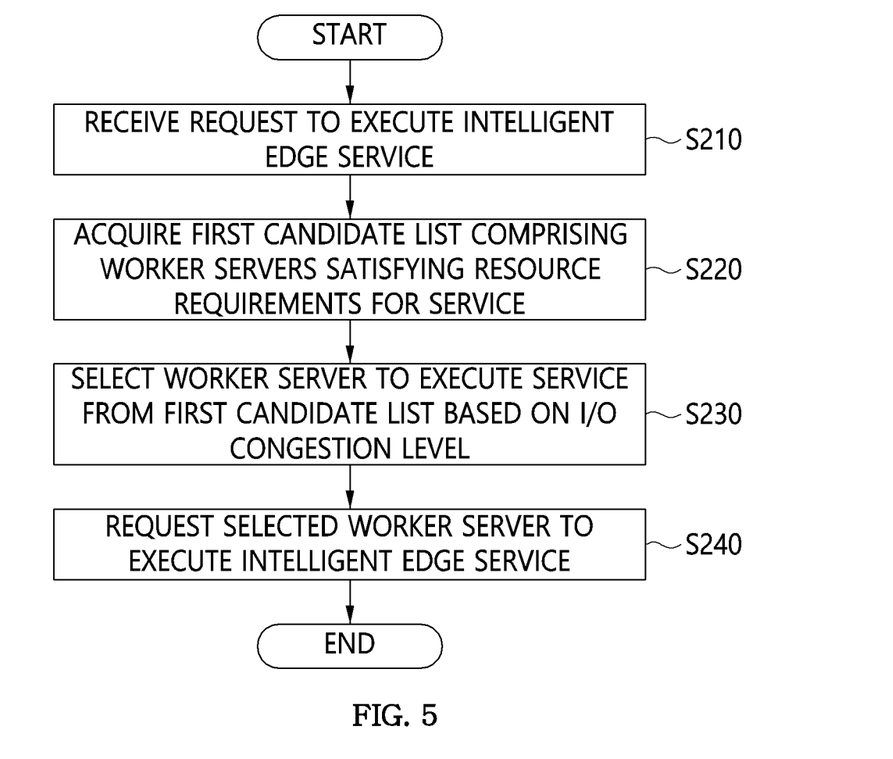
FIG. 5 is a flowchart illustrating a resource allocation method performed by a master server.

FIG. 5 is a flowchart illustrating a resource allocation method performed by a master server.

The global scheduler of a master server receives information required for executing an application in a virtual environment as well as resource requirements, thereby receiving a request to execute an intelligent edge service at step S210.

The global scheduler requests a first candidate list comprising worker servers having available resources required for execution of the intelligent edge service from a global resource manager at step S220.

Here, the first candidate list comprises worker servers having requested resources that are available and having the lowest I/O congestion level.

Here, the I/O congestion level information may include not only the overall I/O congestion level of the worker server but also network congestion level information and storage congestion level information.

The global scheduler selects the worker server having the lowest I/O congestion level from the first candidate list at step S230. When the first candidate list includes one or more worker servers, the data input device in the resource requirements is checked, and the worker server in which the corresponding device has the lowest congestion level is selected.

For example, when the input device of service data is storage, the server having the lowest storage congestion level is selected.

The global scheduler requests the selected worker server to execute the intelligent edge service at step S240.

Figure 6:
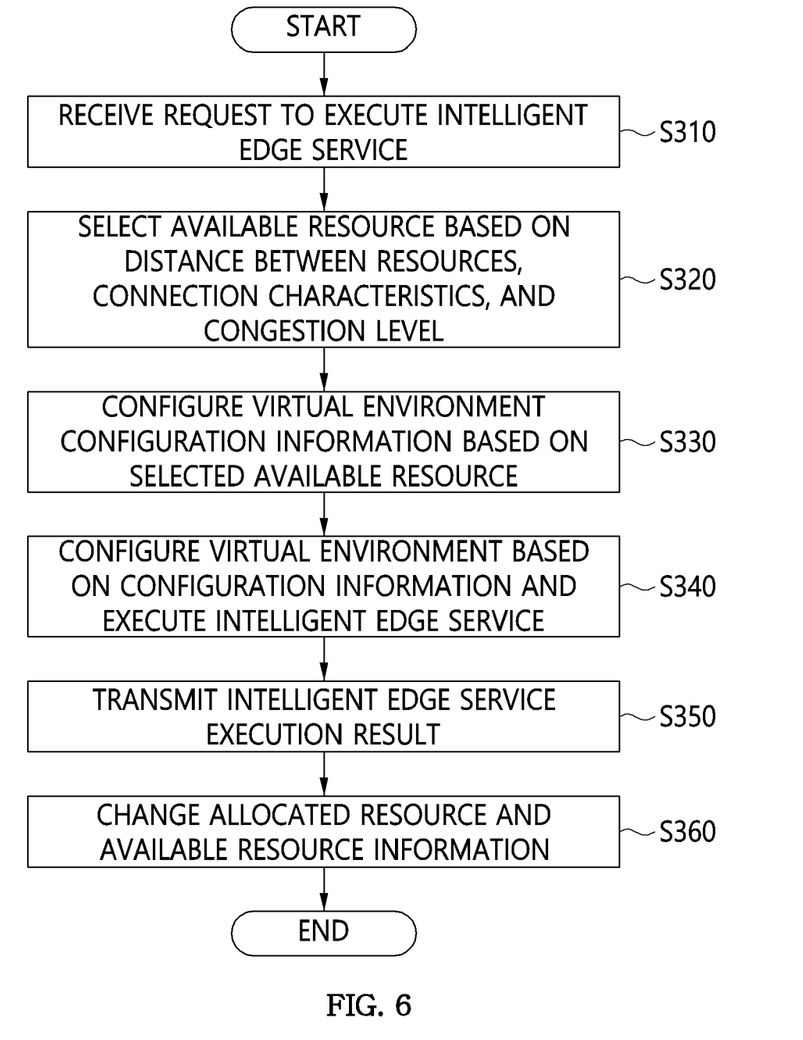
FIG. 6 is a flowchart illustrating a resource allocation method performed by a worker server.

FIG. 6 is a flowchart illustrating a resource allocation method performed by a worker server.

Referring to FIG. 6, a local scheduler receives a request to execute an intelligent edge service from a global scheduler at step S310.

Here, the local scheduler requests information about available resources that meet resource requirements from a topology manager.

The topology manager selects resources from among the available resources in consideration of the distance between resources, characteristics of a connection therebetween, and a congestion level at step S320.

The local scheduler configures virtual environment configuration information based on the available resources received from the topology manager and requests a runtime to execute the service at step S330.

The runtime configures a virtual environment based on the configuration information and executes the intelligent edge service at step S340.

When it confirms that a virtual environment is created and the service is in a running status or when it receives a message indicating success in execution from the runtime, the local scheduler notifies the topology manager and the global scheduler of success in execution of the intelligent edge service at step S350. When execution of the intelligent edge service fails, the local scheduler notifies the global scheduler of the failure.

Finally, when it receives a result indicating the success in execution of the intelligent edge service from the local scheduler, the topology manager updates information about the allocated resources and the available resources, and the global scheduler updates information about the allocated resources through the global resource manager at step S360.

Figure 7:
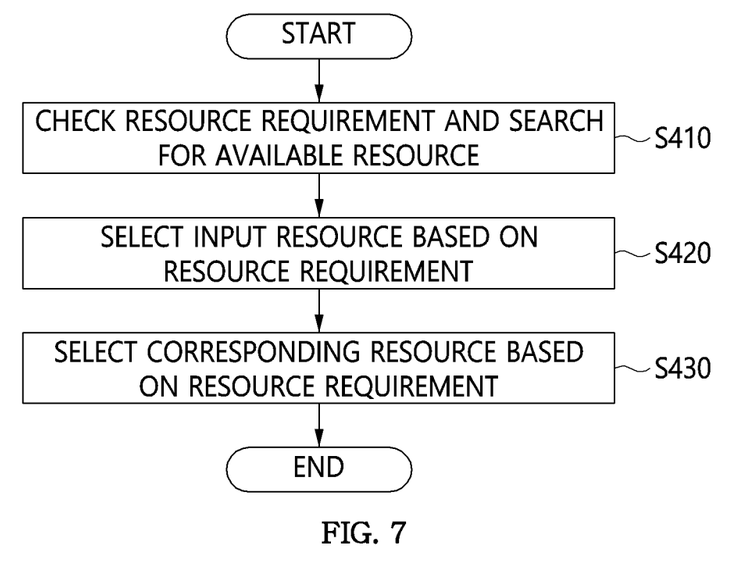
FIG. 7 is a flowchart simply illustrating a process in which a topology manager selects a requested resource.

FIG. 7 is a flowchart simply illustrating a process in which a topology manger selects a requested resource.

In order to avoid data congestion from the input of data to a GPU, the topology manger according to the present disclosure allocates resources by reflecting the characteristics of a connection between GPUs.

In the case of an NVLink, the bandwidth and latency directly reflect a NUMA architecture, but PCIe is not greatly affected by the NUMA architecture as the bandwidth usage is higher.

Referring to FIG. 7, a topology manger checks the input resource specified in resource requirements and searches for available resources at step S410.

Subsequently, an input resource is selected based on the resource requirements at step S420, and resources corresponding to the resource requirements are selected at step S430.

Hereinafter, steps S420 to S430 will be described in detail with reference to FIG. 8 and FIG. 9.

Figure 8:
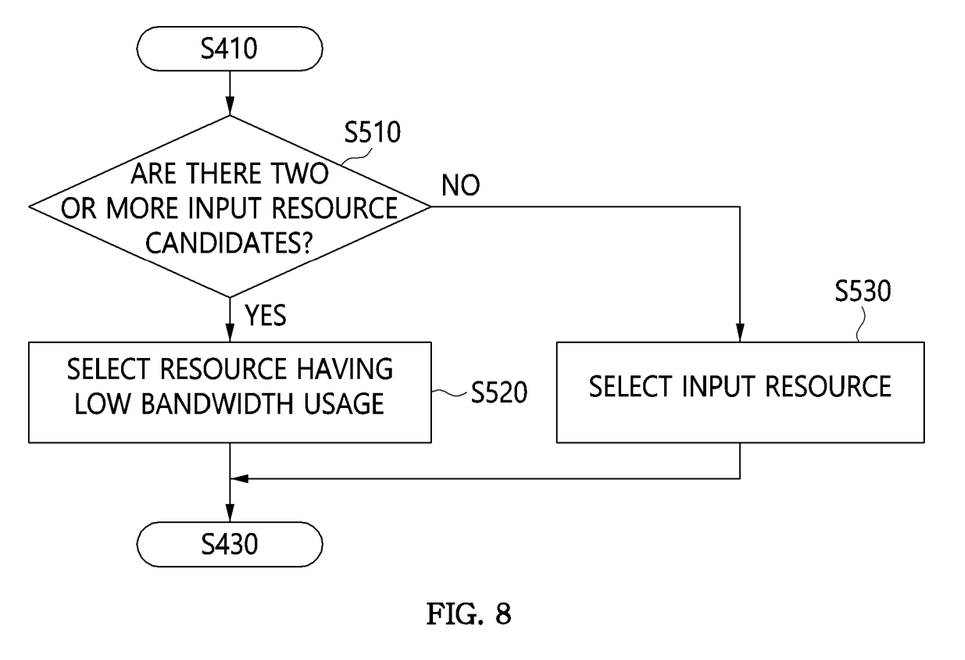
FIG. 8 is a flowchart illustrating in detail a step of selecting an input resource.

FIG. 8 is a flowchart illustrating in detail a step of selecting an input resource.

Referring to FIG. 8, whether two or more input resource candidates are present is determined at step S510. When only one input resource candidate is present, the candidate is selected at step S530. When it is determined that two or more input resource candidates are present, the bandwidth usage of the input resource is compared using a congestion monitor, whereby the resource having the lowest bandwidth usage is selected at step S520.

Figure 9:
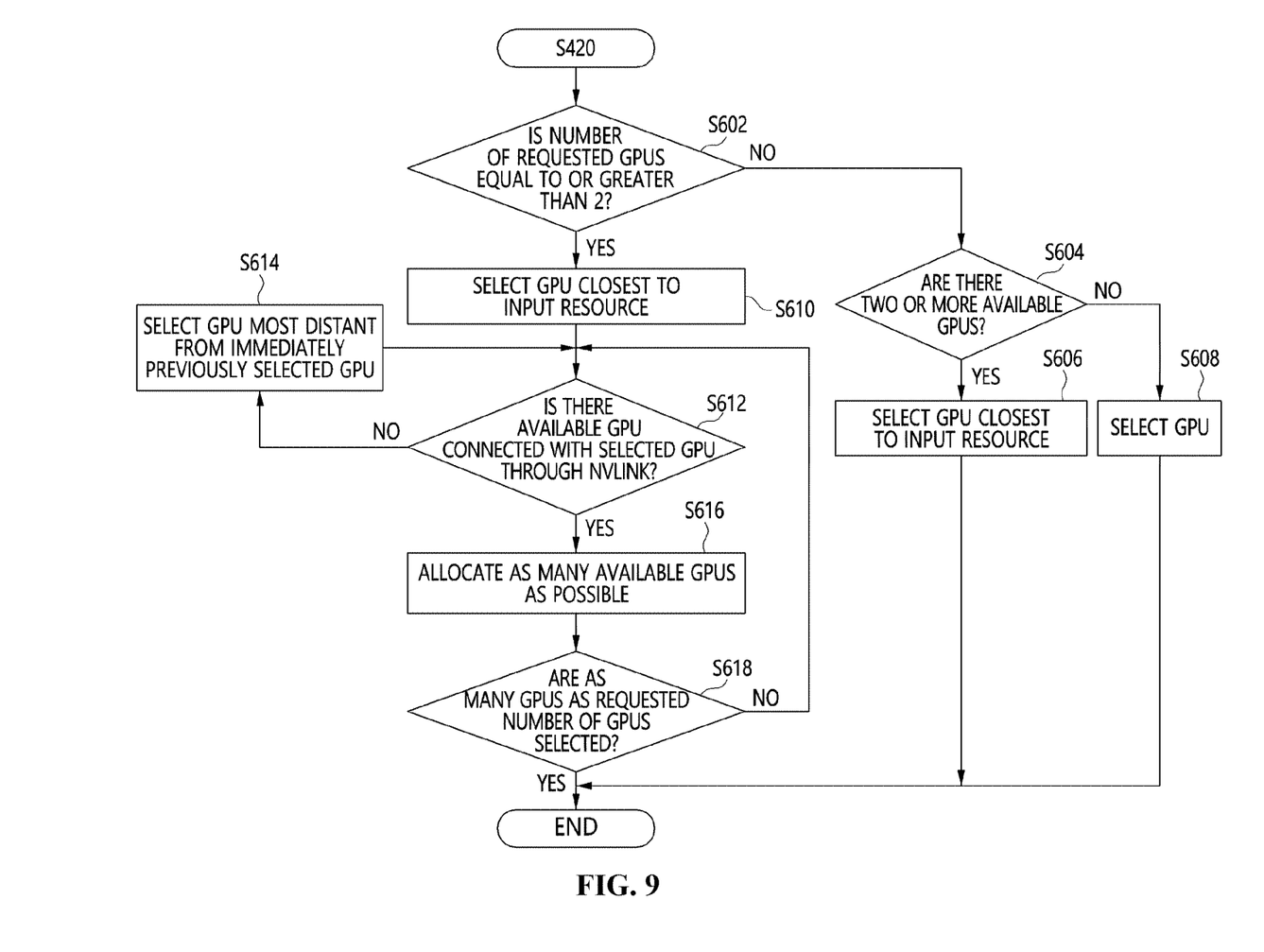
FIG. 9 is a flowchart illustrating in detail a step of selecting a GPU.

FIG. 9 is a flowchart illustrating in detail a step of selecting a GPU as an example of a resource.

Referring to FIG. 9, the number of requested GPUs is checked at step S602. When only one GPU is requested, available GPUs are searched for at step S604. When only one available GPU is present, this GPU is selected at step S608. When multiple available GPUs are present at step S604, the GPU that is closest to the selected input resource is randomly selected at step S606.

When it is determined at step S602 that the number of requested GPUs is equal to or greater than two, the GPU that is closest to the selected input resource is selected at step S610.

Available GPUs connected to the previously selected GPUs through an NVLink are searched for at step S612. When available GPUs connected through an NVLink are present, as many available GPUs as possible are selected to reach the number of unallocated GPUs (the number of requested GPUs—the number of selected GPUs) at step S616.

Meanwhile, when an available GPU connected through an NVLink is not present at step S612, data is transferred through a PCIe connection, so an available GPU that is most distant from the immediately previously selected GPU is selected at step S614.

Then, whether a number of GPUs equal to the number of requested GPUs is selected is checked at step S614. This may be checked by comparing the number of requested GPUs with the number of selected GPUs.

When the number of requested GPUs is equal to the number of selected GPUs, resources other than the input device and the GPUs are allocated from NUMA nodes as fairly as possible. When the number of requested GPUs is not equal to the number of selected GPUs, the process is repeated from step S612.

Figure 10:
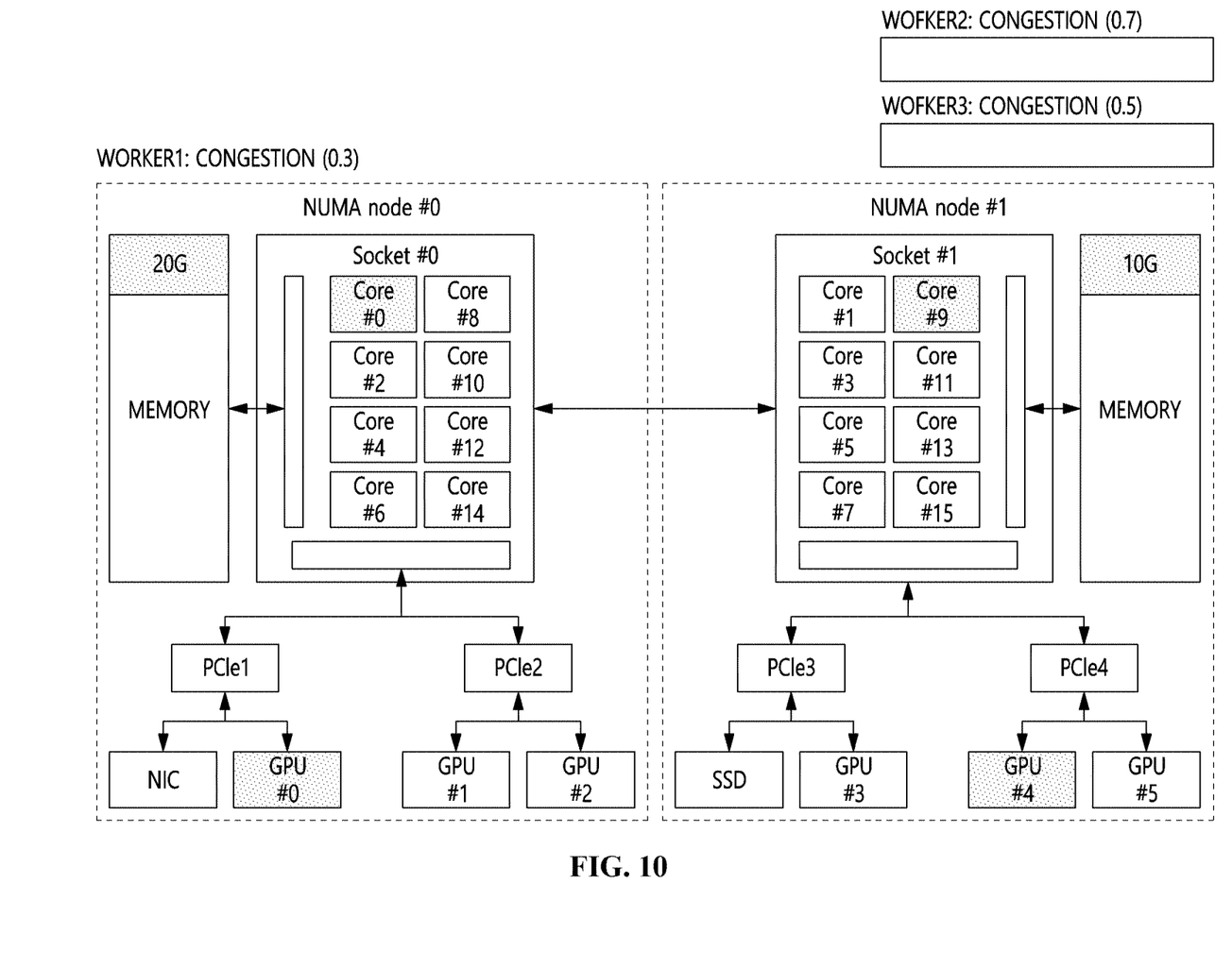
FIG. 10 is a view illustrating an example of resource allocation for an intelligent edge service having the resource requirements of FIG. 3.

FIG. 10 is a view illustrating an example of resource allocation for an intelligent edge service having the resource requirements illustrated in FIG. 3.

Referring to FIG. 10, worker 1 is selected as the worker server to execute the service based on the I/O congestion level of the server. Because a network is selected as the input resource, GPU #0, which is one of GPUs in NUMA node #0 including an NIC, is selected, and a GPU is randomly selected from among GPU #3, GPU #4, and GPU #5, which are most distant GPUs connected to GPU #0 through PCIe. FIG. 10 shows an example in which GPU #4 is selected. Then, CPUs and memory are allocated from multiple NUMA node, rather than a specific NUMA node.

Figure 11:
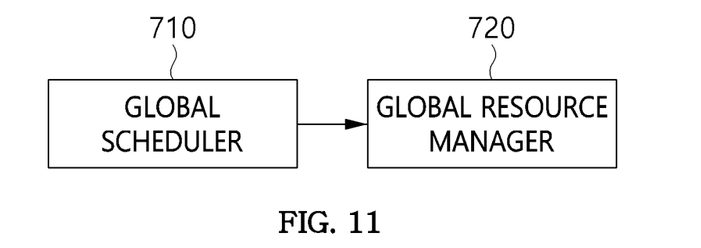
FIG. 11 is a block diagram illustrating an apparatus for resource allocation in an edge-computing environment according to an embodiment of the present disclosure.

FIG. 11 is a block diagram illustrating an apparatus for resource allocation in an edge-computing environment according to an embodiment of the present disclosure.

Referring to FIG. 11, the apparatus according to an embodiment of the present disclosure includes a global scheduler 710 for receiving a request for an intelligent edge service and selecting the worker server to execute the service based on an I/O congestion level and a global resource manager 720 for managing the I/O congestion level and available resource information of worker servers.

Here, the I/O congestion level may be the ratio of the average bandwidth usage to the maximum bandwidth of the I/O devices within a worker server for a preset time.

Here, the global scheduler 710 may select the worker server to execute the service based on I/O congestion level information, network congestion level information, and storage congestion level information.

Here, the global resource manager 720 generates a list comprising worker servers having available resources required for execution of the service and satisfying a preset congestion condition, and the global scheduler 710 may select the worker server having an I/O congestion level corresponding to the preset condition from the list.

Here, the global scheduler 710 may select the worker server of which the input device, corresponding to execution of the service, has the lowest congestion level.

Figure 12:
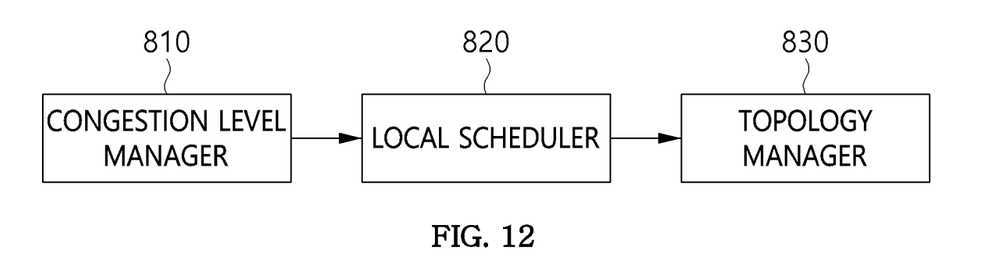
FIG. 12 is a block diagram illustrating an apparatus for resource allocation in an edge-computing environment according to another embodiment of the present disclosure.

FIG. 12 is a block diagram illustrating an apparatus for resource allocation in an edge-computing environment according to another embodiment of the present disclosure.

Referring to FIG. 12, the apparatus according to another embodiment of the present disclosure includes a congestion level manager 810 for monitoring the congestion level of an I/O device, a local scheduler 820 for receiving a request for an intelligent edge service from a master server and configuring virtual environment configuration information, and a topology manager 830 for allocating resources based on topology information.

Here, the topology manager 830 may select an input resource based on resource requirements for the requested service, select the resource to be used based on information about the distance from the selected input resource, and select an additional resource to be used based on information about the connection with the previously selected resource.

Here, when a resource having a preset connection relationship with the previously selected resource is present, the topology manager 830 may select the resource having the preset connection relationship as the resource to be used.

Here, when a resource having a preset connection relationship with the previously selected resource is not present, the topology manager 830 may select a resource corresponding to a preset condition, among remaining resources, as the resources to be used.

Here, when a resource having a preset connection relationship with the previously selected resource is not present, the topology manager 830 may select the resource that is most distant from the immediately previously selected resource, among remaining resources, as the resource to be used.

Figure 13:
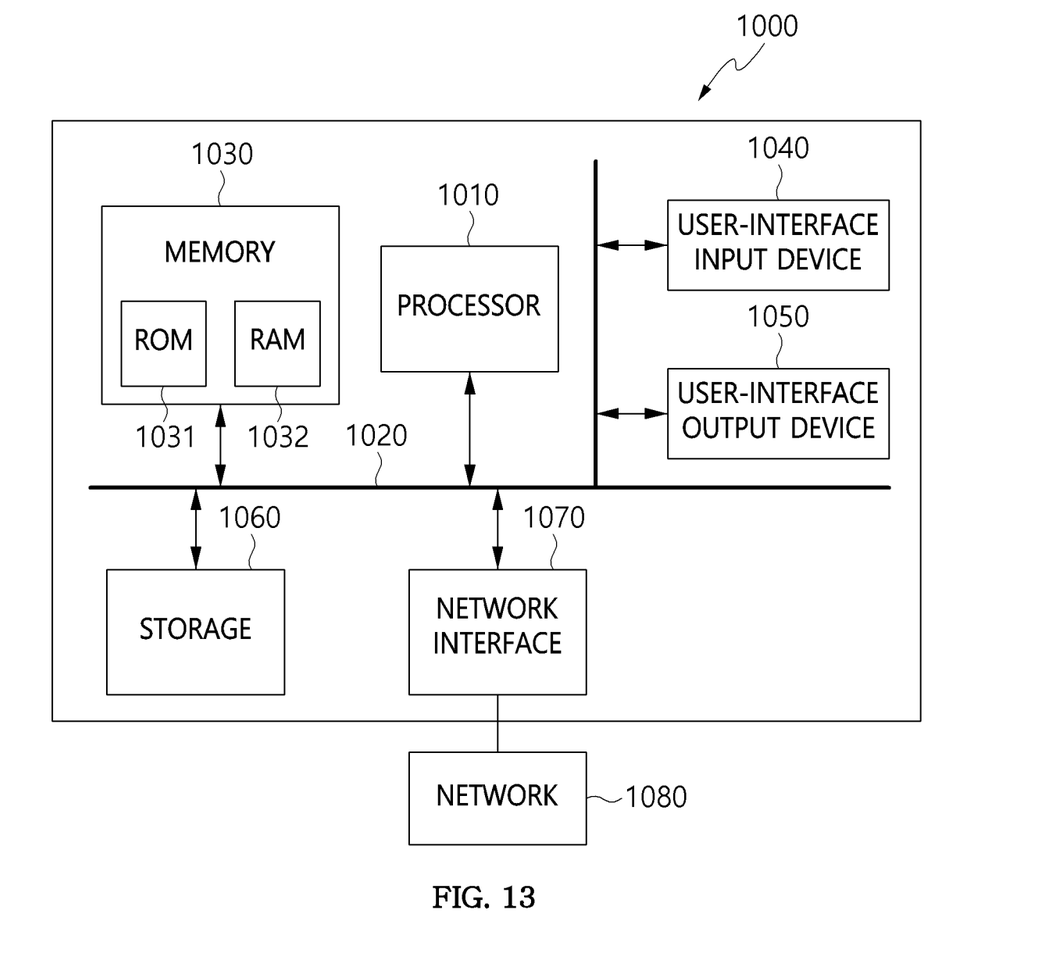
FIG. 13 is a view illustrating the configuration of a computer system according to an embodiment.

FIG. 13 is a view illustrating the configuration of a computer system according to an embodiment.

The apparatus for resource allocation in an edge-computing environment according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to the present disclosure, service execution performance may be improved by optimally allocating resources for an intelligent edge service, which has computing-intensive and I/O-intensive characteristics, in a virtual environment.

Also, the present disclosure allocates an input resource based on a data congestion level, thereby guaranteeing the performance of a service that uses input data requiring high bandwidth.

Also, the present disclosure may guarantee high bandwidth by allocating resources based on resource topology information.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for allocating computing resources in a master server in an edge-computing environment, comprising:
   receiving a request for an intelligent edge service;
   receiving available computing resources in worker servers;
   selecting a worker server among the worker servers to execute the intelligent edge service;
   allocating computing resources in the selected worker server based on input/output (I/O) congestion levels and topology information of the worker servers; and
   configuring a virtual environment based on the allocated computing resources,
   wherein:
   the I/O congestion levels are calculated based on average bandwidth against maximum bandwidth of I/O devices among the worker servers for a preset time, and
   the topology information includes connection information on how nodes in the worker servers are connected.

2. The method of claim 1, wherein selecting the worker server comprises selecting a worker server of which an input device, corresponding to execution of the service, has a lowest congestion level.

3. The method of claim 1, wherein allocating the computing resources includes:
   selecting an input resource based on resource requirements for the service;
   selecting a computing resource to be used based on information about a distance from the selected input resource; and
   selecting an additional computing resource to be used based on information about a connection with the previously selected computing resource.

4. The method of claim 3, wherein selecting the additional computing resource to be used comprises, when an available computing resource having a preset connection relationship with the previously selected computing resource is present, selecting the available computing resource having the preset connection relationship as the additional computing resource to be used.

5. The method of claim 4, wherein selecting the additional computing resource to be used comprises, when the available computing resource having a preset connection relationship with the previously selected computing resource is not present, selecting another available computing resource corresponding to a preset condition as the additional computing resource to be used.

6. The method of claim 5, wherein selecting the additional computing resource to be used comprises, when the available computing resource having a preset connection relationship with the previously selected computing resource is not present, selecting another available computing resource that is most distant from an immediately previously selected computing resource as the additional computing resource to be used.

7. The method of claim 5, wherein the preset connection relationship corresponds to a second connection relationship that supports higher bandwidth than a first connection relationship.

8. An apparatus for allocating computing resources in a master server in an edge-computing environment, comprising:
a memory for storing at least one program;
a processor for executing the program, wherein the program is configured to perform the steps of:
receiving, by a global scheduler, a request for an intelligent edge service, receiving available resources in worker servers, and selecting a worker server among the worker servers to execute the intelligent edge service based on input/output (I/O) congestion levels and topology information of the worker servers; and
managing, by a global resource manager, the I/O congestion levels and available resource information of the worker servers,
wherein:
the I/O congestion levels are calculated based on average bandwidth against maximum bandwidth of I/O devices for a preset time, and
the topology information includes connection information on how nodes in the worker servers are connected.

9. The apparatus of claim 8, wherein the global scheduler selects the worker server of which an input device, corresponding to execution of the service, has a lowest congestion level.

10. An apparatus for allocating computing resources in a worker server in an edge-computing environment, comprising:
a memory for storing at least one program;
a processor for executing the program, wherein the program is configured to perform the steps of:
monitoring, by a congestion manager, an input/output (I/O) congestion level of an input/output (I/O) device;
receiving, by a local scheduler, a request for an intelligent edge service from a master server and configuring virtual environment configuration information; and
allocating, by a topology manager, computing resources based on topology information and the I/O congestion level,
wherein:
the I/O congestion level is calculated based on average bandwidth against maximum bandwidth of I/O devices for a preset time, and
the topology information includes connection information on how nodes in the worker server are connected.

11. The apparatus of claim 10, wherein the topology manager selects an input resource based on resource requirements for the requested service, selects a computing resource to be used based on information about a distance from the selected input resource, and selects an additional computing resource to be used based on information about a connection with the previously selected computing resource.

12. The apparatus of claim 11, wherein, when an available computing resource having a preset connection relationship with the previously selected computing resource is present, the topology manager selects the available computing resource having the preset connection relationship as the additional computing resource to be used.

13. The apparatus of claim 12, wherein, when the available computing resource having a preset connection relationship with the previously selected computing resource is not present, the topology manager selects another available computing resource corresponding to a preset condition as the additional computing resource to be used.

14. The apparatus of claim 13, wherein, when the available computing resource having a preset connection relationship with the previously selected computing resource is not present, the topology manager selects another computing resource that is most distant from an immediately previously selected computing resource as the additional computing resource to be used.

\* \* \* \* \*